US008213526B2

United States Patent
Fulghum

(10) Patent No.: US 8,213,526 B2
(45) Date of Patent: Jul. 3, 2012

(54) MIMO/TRANSMIT DIVERSITY CHANNEL ESTIMATION

(75) Inventor: Tracy L. Fulghum, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1189 days.

(21) Appl. No.: 11/955,526

(22) Filed: Dec. 13, 2007

(65) Prior Publication Data

US 2009/0154576 A1    Jun. 18, 2009

(51) Int. Cl.
*H04B 7/02*    (2006.01)

(52) U.S. Cl. ........ 375/267; 375/259; 375/260; 375/271; 375/316; 375/322

(58) Field of Classification Search .................. 375/135, 375/248, 250, 259, 260, 267, 295, 299, 327, 375/350, 150, 316, 322, 145, 147, 222, 254, 375/262, 271, 306, 328, 342, 346
See application file for complete search history.

(56) References Cited

U.S. PATENT DOCUMENTS

| | | | |
|---|---|---|---|
| 4,455,651 A | 6/1984 | Baran | |
| 6,304,563 B1 | 10/2001 | Blessent et al. | |
| 6,411,649 B1 | 6/2002 | Arslan et al. | |
| 6,760,321 B2 | 7/2004 | Shamsunder | |
| 7,006,557 B2 | 2/2006 | Subrahmanya et al. | |
| 7,746,919 B2* | 6/2010 | Ghosh | 375/147 |
| 7,764,754 B2* | 7/2010 | Walton et al. | 375/347 |
| 2002/0021744 A1 | 2/2002 | Iida | |
| 2003/0002454 A1 | 1/2003 | Lee et al. | |
| 2003/0142758 A1 | 7/2003 | Sakaue et al. | |
| 2004/0033791 A1 | 2/2004 | Schmidl et al. | |
| 2006/0251183 A1 | 11/2006 | Soffer | |
| 2006/0255989 A1 | 11/2006 | Kim et al. | |
| 2006/0268769 A1* | 11/2006 | Pan et al. | 370/328 |
| 2007/0104150 A1 | 5/2007 | Fernandez-Corbaton et al. | |
| 2007/0248149 A1* | 10/2007 | Shimomura et al. | 375/146 |
| 2008/0130716 A1* | 6/2008 | Cho et al. | 375/146 |

(Continued)

FOREIGN PATENT DOCUMENTS

WO    WO 2007013560 A1 *    2/2007

OTHER PUBLICATIONS

Adjoudani, A., et al, "Prototype Experience for MIMO BLAST Over Third-Generation Wireless System," IEEE Journal on Selected Areas in Communications, vol. 21, No. 3, Apr. 2003, pp. 440-451.

(Continued)

*Primary Examiner* — Hirdepal Singh
(74) *Attorney, Agent, or Firm* — Coats & Bennett, P.L.L.C.

(57) ABSTRACT

A receive station of the present invention despreads a received signal over both long and short despreading periods to determine individual channel estimates over each symbol period of an extended period for multiple pilot signals. As a result, the present invention provides channel estimates sufficient for both slow and fast fading conditions. The receive station determines an average channel estimate for each of the pilot signals over the extended period by despreading the received signal over the extended period using mutually orthogonal extended spreading sequences. The receive station further determines a combined channel estimate for the pilot signals over each symbol period of the extended period by despreading the received signal over each symbol period using a common spreading sequence. Based on the average and combined channel estimates, the receive station determines individual channel estimates for each pilot signal over each symbol period of the extended period.

14 Claims, 5 Drawing Sheets

U.S. PATENT DOCUMENTS

| | | | | |
|---|---|---|---|---|
| 2008/0298502 | A1* | 12/2008 | Xu et al. | 375/299 |
| 2009/0201902 | A1* | 8/2009 | Miki et al. | 370/342 |
| 2010/0034320 | A1* | 2/2010 | Champion | 375/340 |
| 2010/0208664 | A1* | 8/2010 | Nishio et al. | 370/329 |

OTHER PUBLICATIONS

Coleri, Sinem, et al., "Channel Estimation Techniques Based on Pilot Arrangement in OFDM Systems," IEEE Transactions on Broadcasting, vol. 48, No. 3, Sep. 2002, pp. 223-229.

Bottomley, Gregory, et al., "Coherent Rake Reception using Noisy Channel Estimates," Vehicular Technology Conference, Fall 2004, IEEE 60th, Sep. 26-29, 2004, vol. 3, pp. 1801-1805.

Javaudin, J.-P. et al, "An OFDM Evolution for the UMTS High Speed Downlink Packet Access," Vehicular Technology Conference, Fall 2004, IEEE 60th, Sep. 26-29, 2004, vol. 2, pp. 846-850.

Fock, G., et al., "Channel Tracking for Rake Receivers in Closely Spaced Multipath Environments," IEEE Journal on Selected Areas in Communications, vol. 19, No. 12, Dec. 2001, pp. 2420-2431.

Chong, Lucy L., et al., "The Effects of Channel-Estimation Errors on a Space-Time Spreading CDMA System with Dual Transmit and Dual Receive Diversity," IEEE Transactions on Communications, vol. 52, No. 7, Jul. 204, pp. 1145-1151.

Gao, Xiqi, et al. "Generalized Multi-carrier Transmission Technique for Beyond 3G Mobile Communications," 2005 IEEE 16th International Symposium on Personal, Indoor and Mobile Radio Communications, Sep. 11-14, 2005, vol. 2, pp. 972-976.

Marques, P., et al., "Low-complexity Channel Estimation for Beyond 3G Systems," Vehicular Technology Conference, 2004, 2004 IEEE 60th, Sep. 26-29, 2004, vol. 3, pp. 2148-2152.

Yang, Baoguo, et al., "Channel Estimation for OFDM Transmission in Multipath Fading Channels Based on Parametric Channel Modeling," IEEE Transactions on Communications, vol. 49, No. 3, Mar. 2001, pp. 467-479.

Lindbom, Lars, et al., "Tracking of Time-Varying Mobile Radio Channels—Part I: The Wiener LMS Algorithm," IEEE Transactions on Communications, vol. 49, No. 12, Dec. 2001, pp. 2207-2217.

Negi, Rohit, et al., "Pilot Tone Selection for Channel Estimation in a Mobile OFDM System," IEEE Transactions on Consumer Electronics, vol. 44, No. 3, Aug. 1998, pp. 1122-1128.

Jones, V.K., et al., "Channel Estimation for Wireless OFDM Systems," Global Telecommunications Conference, 1998, GLOBECOM 98. The Bridge to Global Integration. IEEE, Nov. 8-12, 1998, vol. 2, pp. 980-985.

de Baynast, A., et al., "Chip-level LMMSE Equalization for Downlink MIMO CDMA in Fast Fading Environments," Global Telecommunications Conference, 2004, GLOBECOM '04, IEEE Nov. 29-Dec. 3, 2004, vol. 4, pp. 2552-2556.

3rd Generation Partnership Project; Technical Specification Group Radio Access Network; Physical channels and mapping of transport channels onto physical channels (FDD), 3GPP TS 25.211 V7.0.0 (Mar. 2006) (Release 7), See Section 5.3.3.1.

Ericsson & Qualcomm Europe, "CR 25.211; Addition of FDD MIMO feature to Rel. 7," Mar. 2006, R1-071167 contribution to 3GPP.

Arslan, H. and Bottomley, G.E., "Channel estimation in narrowband wireless communication systems," Wireless Communications & Mobile Computing, vol. 1, Apr./Jun. 2001. 45 pages.

Bottomley, Gregory E., and Arslan, H., "Channel tracking in wireless communication systems," Submitted to Wiley Encyclopedia of Telecommunications, Mar. 2002. 37 pages.

Chen, "Adaptive Channel Estimation and Dedicated Pilot Power Adjustment Based on the Fading-Rate Measurement for a Pilot-Aided CDMA System," IEEE Journal on Selected Areas in Communications, Jan. 2001, pp. 132-140, vol. 19, No. 1, IEEE Service Center, Piscataway, NJ.

Schulz-Rittich et al., "Channel Estimation for DS-CDMA with Transmit Diversity over Frequency Selective Fading Channels," IEEE Vehicular Technology Conference, May 6-9, 2001, pp. 1973-1977, IEEE, New York, NY.

* cited by examiner

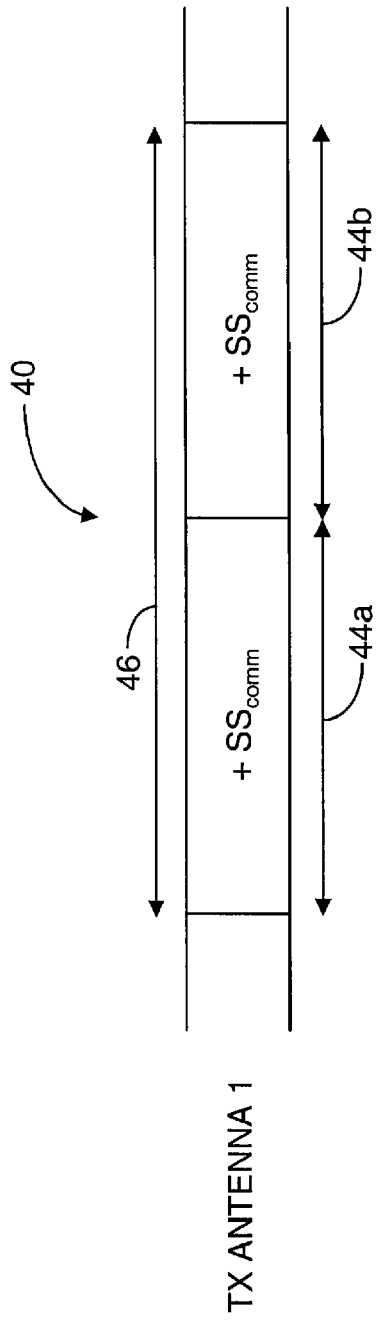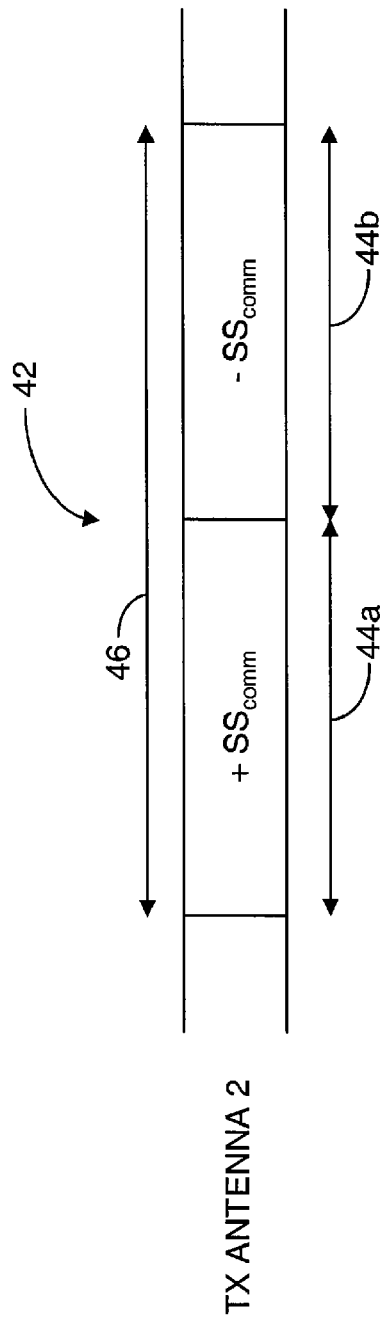

MIMO/TRANSMIT DIVERSITY CHANNEL ESTIMATION

BACKGROUND

The present invention relates generally to determining channel estimates for a MIMO communication system, and more particularly to determining such channel estimates in slow and fast fading conditions.

Release 7 of the UMTS standard uses a common 256-chip spreading sequence to generate an extended 512-chip spreading sequence for pilot signals generated by respective transmitters in a Multiple-Input, Multiple-Output (MIMO) communication system. To distinguish between the transmitters, the polarity of the common spreading sequence in the extended spreading sequence is alternated every 256 chips for one transmitter relative to the other transmitter. This produces two mutually orthogonal 512-chip spreading sequences for the pilot signals.

The receiver may despread the received signal using the extended 512-chip spreading sequences to determine the channel estimates for each pilot signal. This process provides one channel estimate for every 512 chips of each pilot signal. For a pilot signal having ten symbol periods per slot, where each symbol period contains 256 chips, this process provides five channel estimates per slot for each pilot signal. Conventional systems average the five channel estimates over the slot to gain a slot-specific channel estimate with reduced noise and/or interference.

The slot-specific channel estimates resulting from the above-described process typically have sufficient accuracy for slow fading conditions, but not for fast fading conditions. Thus, there remains a need for determining accurate channel estimates under fast fading conditions in MIMO communication systems.

SUMMARY

The present invention despreads a received signal over both long and short despreading periods to determine channel estimates for multiple pilot signals that are sufficient for both slow and fast fading conditions. More particularly, a wireless receive station according to the present invention receives a signal comprising multiple pilot signals from multiple different transmit antennas of a transmit station in a MIMO communication system. A despreader determines an average channel estimate for each of the pilot signals over an extended period comprising multiple symbol periods by despreading the received signal over the extended period using mutually orthogonal extended spreading sequences. The despreader further determines a combined channel estimate for each symbol period of the extended period by despreading the received signal over each symbol period using a common spreading sequence. Based on the average and combined channel estimates, a signal processor determines individual channel estimates for each pilot signal over each symbol period of the extended period. For example, the signal processor may solve a system of linear equations based on the average and combined channel estimates to determine the individual channel estimates.

BRIEF DESCRIPTION OF THE DRAWINGS

FIGS. 2A and 2B show exemplary extended spreading sequences for two pilot signals transmitted by two antennas.

DETAILED DESCRIPTION

Figure 1:
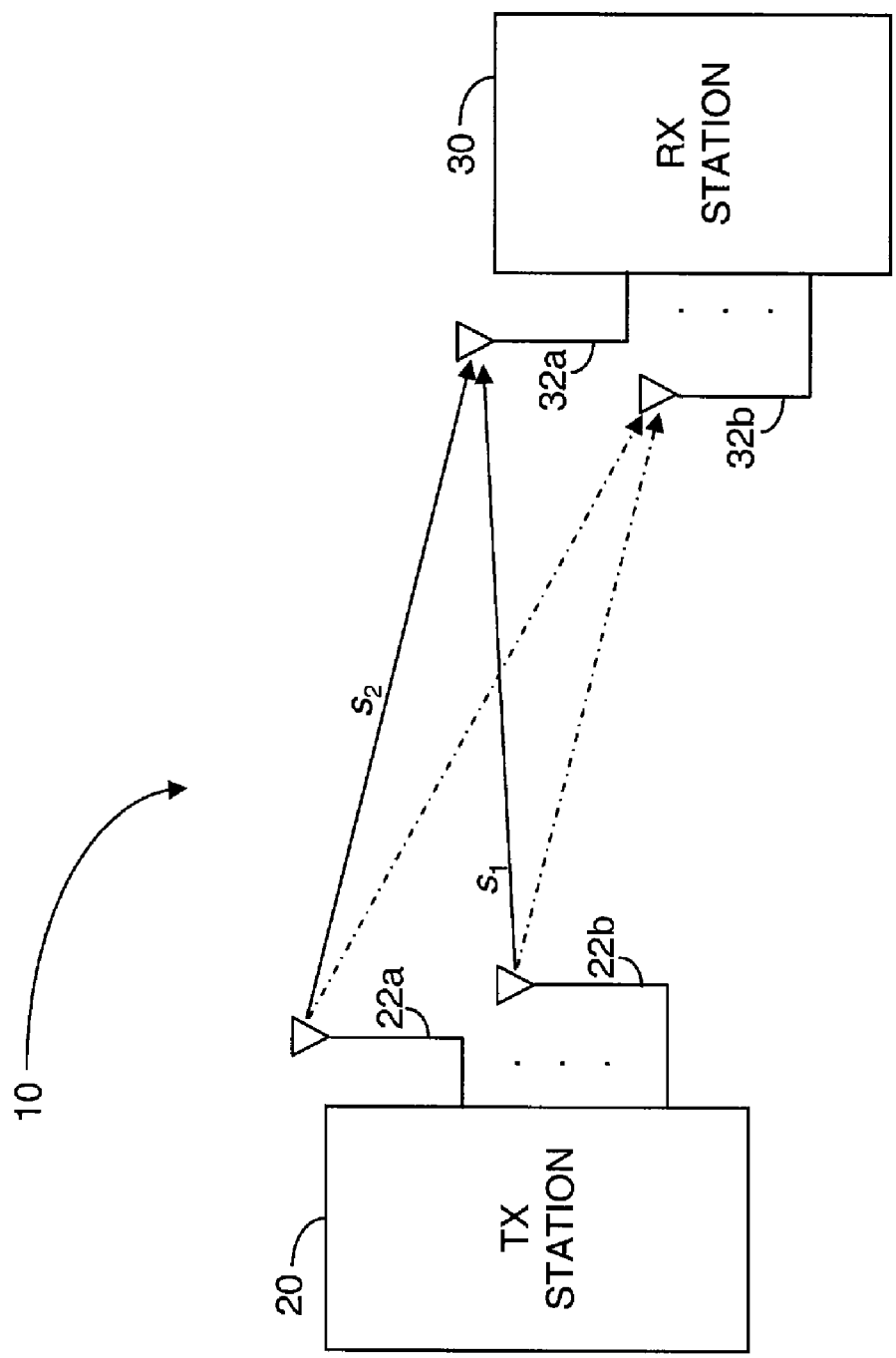
FIG. 1 shows a block diagram of an exemplary MIMO communication system.

FIG. 1 shows a block diagram of a MIMO communication system 10. Communication system 10 comprises a transmit station 20 and a receive station 30. The transmit station 20 may comprise a base station and the receive station 30 may comprise a wireless communication device, or vice versa. The transmit station 20 transmits wireless signals from multiple transmit antennas 22 to multiple receive antennas 32 of the receive station 30. It will be appreciated that while FIG. 1 only shows transmitting wireless signals from two transmit antennas 22a, 22b to two receive antennas 32a, 32b, MIMO communication system 10 may transmit wireless signals from any number of transmit antennas 22 to any number of receive antennas 32. It will also be appreciated that the present invention applies to Multiple-Input, Single-Output (MISO) communication systems that implement transmit diversity.

The transmit station 20 may transmit pilot signals from each antenna 22 to provide a receive station 30 with known data. The receive station 30 may use the received pilot signals to determine channel estimates for the wireless communication channels between each transmit and receive antenna 22, 32. The receive station 30 may use the determined channel estimates, for example, to improve signal quality and suppress interference. To enable the receive station 30 to distinguish channel estimates associated with different pilot signals, the transmit station 20 transmits mutually orthogonal pilot signals from different transmit antennas 22. For simplicity, the following discussion focuses on two pilot signals $s_1$, $s_2$ generated by the transmit station 20 using two mutually orthogonal spreading sequences, transmitted by respective transmit antennas 22a, 22b, and received by one receive antenna 32a.

For UMTS, the transmit station 20 generates the orthogonal pilot signals using an extended 512-chip spreading sequence derived from a common 256-chip spreading sequence $SS_{comm}$. The polarity of the common spreading sequence may be alternated every 256 chips of an extended 512-chip period for one transmit antenna 22a relative to the other transmit antenna 22b. This produces two mutually orthogonal extended spreading sequences. The transmit station 20 uses the extended spreading sequences to generate the pilot signals $s_1$ and $s_2$.

FIGS. 2A and 2B show exemplary extended spreading sequences 40, 42 used to generate pilot signals for transmission from different transmit antennas 22. For this example, $SS_{comm}$ spans one symbol period 44, and the extended spreading sequences span an extended period 46 comprising two symbol periods 44. To ensure mutual orthogonality between the transmitted pilot signals, one extended spreading sequence alternates the polarity of the common spreading sequence $SS_{comm}$ over the extended period 46 relative to the other spreading sequence. For example, the extended spreading sequence 40 for the first transmit antenna 22a (FIG. 2A) may comprise two aggregated copies of $SS_{comm}$ having a common polarity, while the extended spreading sequence 42 for the second transmit antenna 22b (FIG. 2B) may comprise two aggregated copies of $SS_{comm}$ having opposite polarity. The resulting spreading sequences 40, 42 are mutually orthogonal over the extended period 46. Using these mutually orthogonal spreading sequences, the transmit station 20 may generate mutually orthogonal pilot signals $s_1$, $s_2$ for transmission by different transmit antennas 22a, 22b to the receive station 30.

The receive station 30 receives the pilot signals as a combined signal at one receive antenna 32a, and determines channel estimates based on the received signal. For example, receive station 30 may determine channel estimates for the channel corresponding to $s_1$ and for the channel corresponding to $s_2$ by despreading the received signal using the extended 512-chip spreading sequences. This process provides one channel estimate for every 512 chips of each pilot signal. For a pilot signal having ten symbol periods per slot, where each symbol period contains 256 chips, this process provides five channel estimates per slot for each pilot signal. Such channel estimates are typically sufficient under slow fading conditions. However, under fast fading conditions, such channel estimates do not have sufficient accuracy. For fast fading conditions, it is desirable to have individual channel estimates over each symbol period 44 of each pilot signal. However, because the pilot signals are not mutually orthogonal over the symbol period 44, despreading the received signal over the symbol period 44 does not provide the desired individual channel estimates.

Figure 3:
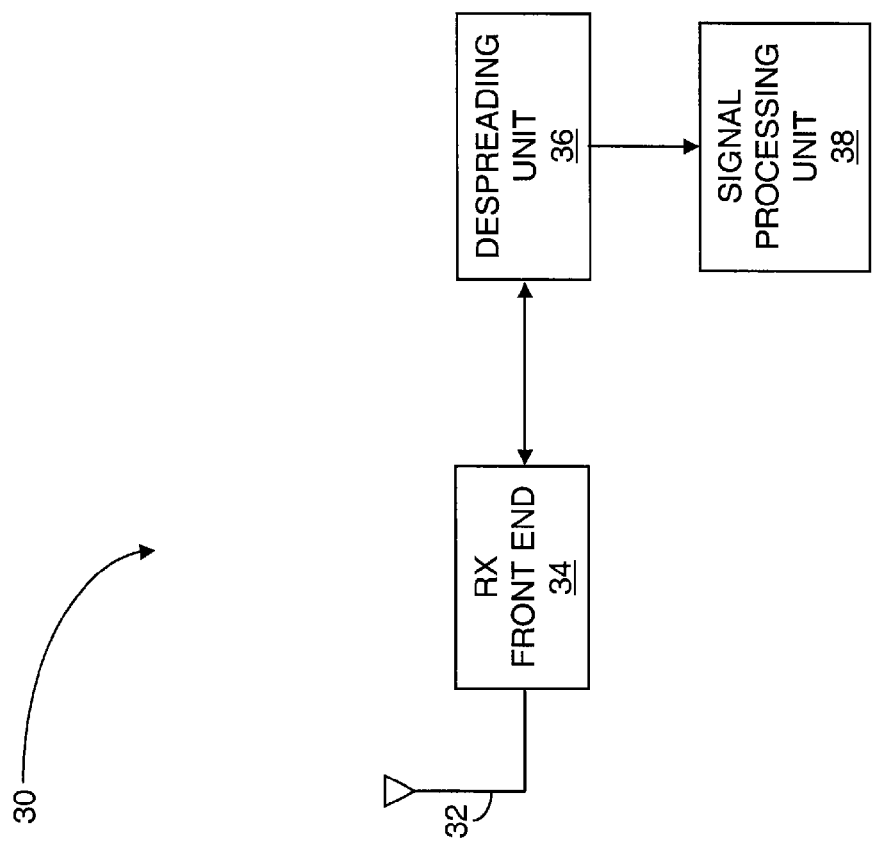
FIG. 3 shows a block diagram of a receive station according to one exemplary embodiment of the present invention.
Figure 4:
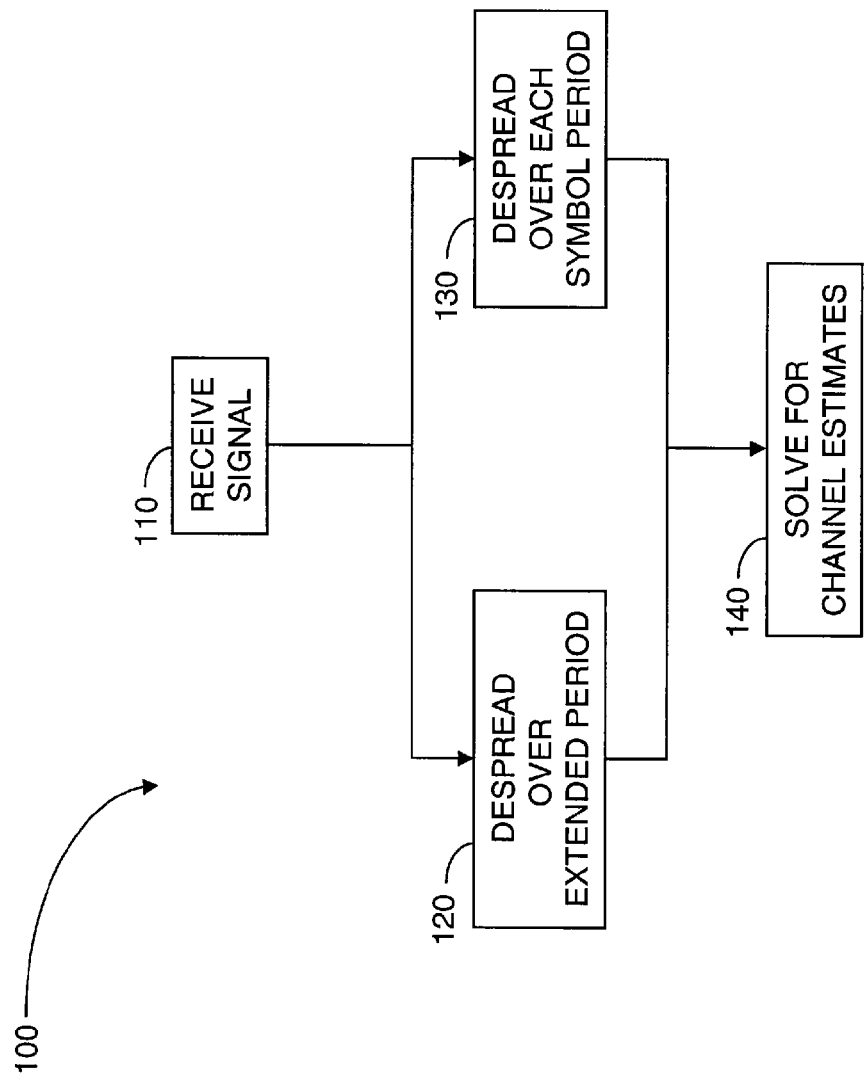
FIG. 4 shows a process according to one exemplary embodiment of the present invention.

The present invention addresses this problem by despreading the received signal over both the extended and symbol periods to determine individual channel estimates over each symbol period 44 for each pilot signal. FIG. 3 shows an exemplary receive station 30 for implementing the present invention, while FIG. 4 shows an exemplary process 100 implemented by the receive station 30. Receive station 30 comprises a receiver front end 34 and a channel estimation unit comprising a despreader 36 and a signal processor 38. The receiver front end 34 receives a wireless signal comprising the pilot signals $s_1$ and $s_2$ (block 110), and filters, down-converts, and amplifies the received signal. The despreader 36 despreads the received signal output by the receiver front end 34 using the extended spreading sequences (block 120) to determine a first set of despread pilot signals over the extended period 46. Further, the despreader 36 despreads the received signal using the common spreading sequence to determine a second set of despread pilot signals over each symbol period 44 of the extended period 46 (block 130). The signal processor 38 processes the first set of despread pilot signals to determine average channel estimates over the extended period 46 for each pilot signal, and processes the second set of despread pilot signals to determine combined channel estimates over each symbol period 44. The signal processor 38 subsequently processes the average and combined channel estimates to determine individual channel estimates over each symbol period 44 of the extended period 46 for each pilot signal (block 140). This process may be repeated for the remaining extended periods of the received signal.

More particularly, despreader 36 despreads the received signal over the extended period 46 using the mutually orthogonal spreading sequences discussed above, and the signal processor 38 processes the resulting despread pilot signals to determine average channel estimates over the extended period 46 for the pilot signals. For example, the received signal may be despread over an extended period 46 using the extended spreading sequence associated with the first transmit antenna 22a (see FIG. 2A) to determine an average channel estimate $\bar{c}_1$ for $s_1$ over the extended period 46. The received signal may also be despread over the extended period 46 using the extended spreading sequence associated with the second transmit antenna 22b (see FIG. 2B) to determined an average channel estimate $\bar{c}_2$ for $s_2$ over the extended period 46. Equation (1) shows the resulting average channel estimates $\bar{c}_1, \bar{c}_2$.

$$\bar{c}_1 = c_1 + \frac{\Delta_1}{2} \qquad (1)$$
$$\bar{c}_2 = c_2 + \frac{\Delta_2}{2}$$

In Equation (1), $\Delta_1$ and $\Delta_2$ represent the dynamic change in the channel estimates between the symbol periods 44 for respective pilot signals $s_1, s_2$. The channel estimates in Equation (1) represent average channel estimates for the extended period 46. As discussed above, the average channel estimates do not provide the actual channel estimate ($c_1$ or $c_2$) for a first symbol period 44a of the extended period 46. Further, neither estimate provides the actual channel estimate ($c_1 + \Delta_1$ or $c_2 + \Delta_2$) for a subsequent symbol period 44b of the extended period 46.

To address this problem, the despreader 36 also despreads the received signal over each symbol period 44 of the extended period 46 using the common spreading sequence $SS_{comm}$, and the signal processor 38 processes the resulting despread pilot signals to generate the combined channel estimates $c_{1,comb}$ and $c_{2,comb}$ given by Equation (2).

$$c_{1,comb} = c_1 + c_2$$
$$c_{2,comb} = c_1 + \Delta_1 - c_2 - \Delta_2 \qquad (2)$$

More particularly, the received signal is despread over a first symbol period 44a of the extended period 46 using $SS_{comm}$ to generate $c_{1,comb}$, and is despread over a subsequent symbol period 44b of the extended period 46 using $SS_{comm}$ to generate $c_{2,comb}$. The signal processor 38 processes the average and combined channel estimates $\bar{c}_1, \bar{c}_2, c_{1,comb}$, and $c_{2,comb}$ to solve for the four unknowns: $c_1, c_2, \Delta_1$, and $\Delta_2$. In so doing, the signal processor 38 determines individual channel estimates over each symbol period 44 of the extended period 46 for both $s_1$ and $s_2$.

Signal processor 38 may process the average and combined channel estimates $\bar{c}_1, \bar{c}_2, c_{1,comb}$, and $c_{2,comb}$ using a system of linear equations to solve for the four unknowns $c_1, c_2, \Delta_1$, and $\Delta_2$. Equations (1) and (2) may be collectively written in matrix form as:

$$\begin{bmatrix} 1 & 1 & 0 & 0 \\ 1 & -1 & 1 & -1 \\ 1 & 0 & \frac{1}{2} & 0 \\ 0 & 1 & 0 & \frac{1}{2} \end{bmatrix} \begin{bmatrix} c_1 \\ c_2 \\ \Delta_1 \\ \Delta_2 \end{bmatrix} = \begin{bmatrix} c_{1,comb} \\ c_{2,comb} \\ \bar{c}_1 \\ \bar{c}_2 \end{bmatrix}. \qquad (3)$$

Equation (3) may be rewritten as:

$$\begin{bmatrix} c_1 \\ c_2 \\ \Delta_1 \\ \Delta_2 \end{bmatrix} = \begin{bmatrix} \frac{1}{2} & -\frac{1}{2} & 1 & -1 \\ \frac{1}{2} & \frac{1}{2} & -1 & 1 \\ -1 & 1 & 0 & 2 \\ -1 & -1 & 2 & 0 \end{bmatrix} \begin{bmatrix} c_{1,comb} \\ c_{2,comb} \\ \bar{c}_1 \\ \bar{c}_2 \end{bmatrix}. \qquad (4)$$

Signal processor 38 may determine the individual channel estimates over each symbol period 44 of the extended period 46 by solving Equation (4) using the average and combined channel estimates. More particularly, signal processor 38 solves Equation (4) to determine $c_1$ and $c_1+\Delta_1$ for consecutive symbol periods 44a, 44b of the extended period 46 of the pilot signal associated with the first transmit antenna 22a, and to determine $c_2$ and $c_2+\Delta_2$ for consecutive symbol periods 44a, 44b of the extended period 46 of the pilot signal associated with the second transmit antenna 22b. It will be appreciated that in solving Equation (4), signal processor 38 may also determine the dynamic change ($\Delta_1$ and $\Delta_2$) in the channel estimates from one symbol period 42 to the next for the respective pilot signals. The signal processor 38 may further process and/or evaluate $\Delta_1$ and $\Delta_2$ to determine a fading rate for the pilot signals. For example, larger $\Delta_1$ values with respect to $c_1$ indicate a faster fading channel for $s_1$ than smaller values.

The present invention provides a despreader 36 and signal processor 38 that determine individual channel estimates over each symbol period 44 of an extended period 46 for multiple pilot signals when mutually orthogonal extended spreading sequences are used to generate the pilot signals. This enables the receive station 30 to determine a symbol-to-symbol sliding average of the channel estimates for each pilot signal. Such symbol-to-symbol sliding averages are more accurate, and therefore, more appropriate for fast fading conditions than the above-discussed slot-specific channel estimates.

Figure 5:
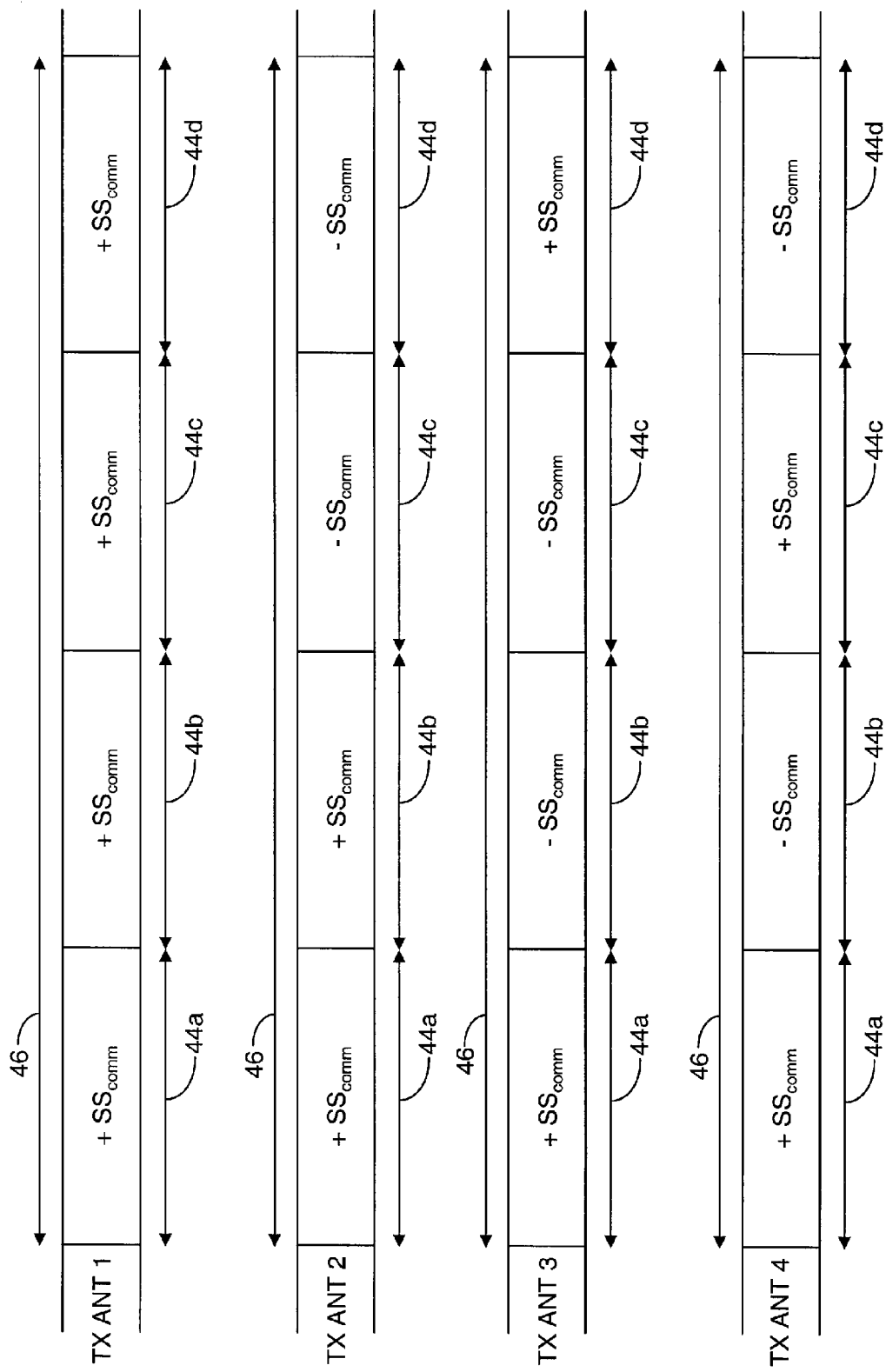
FIG. 5 shows exemplary extended spreading sequences for four pilot signals transmitted by four antennas.

The above describes the invention in terms of an extended period 46 spanning two 256-chip symbol periods 44. However, it will be appreciated that the present invention may be used with any extended period that spans any number of multiple symbol periods 44 where mutually orthogonal spreading sequences are used over the extended period. For example, when four transmit antennas 22 transmit to one receive antenna 32, the extended period 46 may span four 256-chip symbol periods 44, as shown by FIG. 5. For this example, despreader 36 despreads the received signal output by the receiver front end 34 using the extended spreading sequences to determine a first set of despread pilot signals over the extended period 46. Further, the despreader 36 despreads the received signal using the common spreading sequence to determine a second set of despread pilot signals over each symbol period 44a, 44b, 44c, 44d of the extended period 46. The signal processor 38 processes the first set of despread pilot signals to determine average channel estimates ($\overline{c}_1, \overline{c}_2, \overline{c}_3, \overline{c}_4$) over the extended period 46 for each pilot signal, and processes the second set of despread pilot signals to determine combined channel estimates ($c_{1,comb}, c_{2,comb}, c_{3,comb}, c_{4,comb}$) over each symbol period 44a, 44b, 44c, 44d. The signal processor 38 subsequently processes the average and combined channel estimates to determine $c_1, c_2, c_3$, and $c_4$, and $\Delta_1, \Delta_2, \Delta_3$, and $\Delta_4$ that are used to determine the individual channel estimates over each symbol period 44 of the extended period 46.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining channel estimates for pilot signals transmitted from different transmit antennas in a MIMO communication system, the method comprising:

despreading a received signal over an extended period comprising multiple symbol periods using mutually orthogonal extended spreading sequences for the pilot signals to obtain average channel estimates for the pilot signals over the extended period, wherein said mutually orthogonal extended spreading sequences comprise first and second extended spreading sequences generated based on a common spreading sequence for respective first and second pilot signals;

despreading the received signal over each symbol period of said extended period using the common spreading sequence to obtain combined channel estimates for the pilot signals over each symbol period of the extended period; and determining individual channel estimates for the pilot signals over each symbol period of the extended period based on the average channel estimates and the combined channel estimates.

2. The method of claim 1 further comprising determining a fading rate associated with the pilot signals based on the combined channel estimates and the average channel estimates.

3. The method of claim 1 wherein the first extended spreading sequence is generated based on multiple copies of the common spreading sequence having a common polarity for each symbol period of the extended period, and wherein the second extended spreading sequence is generated based on multiple copies of the common spreading sequence having an alternating polarity for each symbol period of the extended period.

4. The method of claim 1 wherein the mutually orthogonal extended spreading sequences each span two successive symbol periods, and wherein the common spreading sequence spans one symbol period.

5. The method of claim 1 wherein determining the individual channel estimates comprises solving a system of linear equations based on the average channel estimates and the combined channel estimates.

6. A receive station in a MIMO communication system, the receive station comprising:

a receiver front end to receive a signal comprising a combination of multiple pilot signals from different transmit antennas in the MIMO communication system;

a despreader configured to:
despread the received signal over an extended period comprising multiple symbol periods using mutually orthogonal extended spreading sequences for the pilot signals to obtain a first set of despread signals over the extended period, wherein said mutually orthogonal extended spreading sequences comprise first and second extended spreading sequences generated based on a common spreading sequence for respective first and second pilot signals; and despread the received signal over each symbol period of said extended period using the common spreading sequence to obtain a second set of despread pilot signals over each symbol period of the extended period;

a signal processor configured to:
determine average channel estimates for the pilot signals over the extended period based on the first set of despread pilot signals;

determine combined channel estimates for the pilot signals over each symbol period of the extended period based on the second set of despread signals; and determine individual channel estimates for the pilot signals over each symbol period of the extended period based on the average channel estimates and the combined channel estimates.

7. The receive station of claim 6 wherein the signal processor is further configured to determine a fading rate associated with the pilot signals based on the combined channel estimates and the average channel estimates.

8. The receive station of claim 6 wherein the first extended spreading sequence comprises multiple copies of the common spreading sequence having a common polarity for each symbol period of the extended period, and wherein the second extended spreading sequence comprises multiple copies of the common spreading sequence having an alternating polarity for each symbol period of the extended period.

9. The receive station of claim 6 wherein the mutually orthogonal extended spreading sequences each span two successive symbol periods, and wherein the common spreading sequence spans one symbol period.

10. The receive station of claim 6 wherein the signal processor determines the individual channel estimates by solving a system of linear equations based on the average channel estimates and the combined channel estimates.

11. The receive station of claim 6 wherein the receive station comprises a wireless communication device.

12. A channel estimation unit in a receive station of a MIMO communication system, wherein the receive station receives a signal comprising a combination of multiple pilot signals from different transmit antennas in the MIMO communication system, said channel estimation unit comprising:
    a despreader configured to:
        despread the received signal over an extended period comprising multiple symbol periods using mutually orthogonal extended spreading sequences for the pilot signals to obtain a first set of despread signals over the extended period, wherein said mutually orthogonal extended spreading sequences comprise first and second extended spreading sequences generated based on a common spreading sequence for respective first and second pilot signals; and
        despread the received signal over each symbol period of said extended period using the common spreading sequence to obtain a second set of despread pilot signals over each symbol period of the extended period;
    a signal processor configured to:
        determine average channel estimates for the pilot signals over the extended period based on the first set of despread pilot signals;
        determine combined channel estimates for the pilot signals over each symbol period of the extended period based on the second set of despread signals; and
        determine individual channel estimates for the pilot signals over each symbol period of the extended period based on the average channel estimates and the combined channel estimates.

13. The channel estimation unit of claim 12 wherein the signal processor is further configured to determine a fading rate associated with the pilot signals based on the combined channel estimates and the average channel estimates.

14. The channel estimation unit of claim 12 wherein the signal processor determines the individual channel estimates by solving a system of linear equations based on the average channel estimates and the combined channel estimates.

* * * * *